US008353771B2

(12) United States Patent
Jiao et al.

(10) Patent No.: US 8,353,771 B2
(45) Date of Patent: Jan. 15, 2013

(54) SYSTEM OF MOBILE ONLINE GAME AND METHOD FOR COMMUNICATING BETWEEN MOBILE GAME TERMINALS

(75) Inventors: Jingmin Jiao, Shenzhen (CN); Qian Liu, Shenzhen (CN); Jieping Zhong, Shenzhen (CN); Hongsen Huang, Shenzhen (CN); Jie Tang, Shenzhen (CN); Yupeng Zhang, Shenzhen (CN); Shaobing Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1558 days.

(21) Appl. No.: 11/615,166

(22) Filed: Dec. 22, 2006

(65) Prior Publication Data

US 2007/0265067 A1 Nov. 15, 2007

Related U.S. Application Data

(63) Continuation of application No. PCT/CN2005/002226, filed on Dec. 16, 2005.

(30) Foreign Application Priority Data

Dec. 29, 2004 (CN) .......................... 2004 1 0104104

(51) Int. Cl.
*A63F 9/24* (2006.01)
*A63F 13/00* (2006.01)
*G06F 17/00* (2006.01)
*G06F 19/00* (2011.01)
(52) U.S. Cl. ................. 463/42; 463/40; 463/41
(58) Field of Classification Search ....... 463/42
See application file for complete search history.

(56) References Cited

U.S. PATENT DOCUMENTS 6,152,824 A * 11/2000 Rothschild et al. ............. 463/42
(Continued)

FOREIGN PATENT DOCUMENTS

CN 1499744 5/2004
(Continued)

OTHER PUBLICATIONS

International Search Report corresponding to co-pending International Patent Application Serial No. PCT/CN2005/002226, The State Intellectual Property Office, The P.R. China, dated Mar. 30, 2006, 2 pages.

(Continued)

*Primary Examiner* — Michael Cuff
*Assistant Examiner* — Kevin Y Kim
(74) *Attorney, Agent, or Firm* — Slater & Matsil, L.L.P.

(57) ABSTRACT

An embodiment of the present invention discloses a mobile online game system which includes a first mobile game terminal, a second mobile game terminal and a game platform, and the first mobile game terminal acquires a P2P communication address of the second mobile game terminal from the game platform, creates a P2P connection with the second mobile game terminal, and communicates with the second mobile game terminal via the P2P connection. An embodiment of the present invention discloses as well a method for communicating between mobile game terminals. Because of the adoption of a P2P connection between the mobile game terminals for communicating, the forwarding of data interaction between the mobile game terminals by the game platform in the related art is avoided, so that the rate and efficiency of data interaction between the mobile game terminals are improved, and the data processing burden on the game platform is released.

19 Claims, 4 Drawing Sheets

U.S. PATENT DOCUMENTS

| | | | |
|---|---|---|---|
| 2001/0016519 A1 | 8/2001 | Choe | 463/42 |
| 2002/0035594 A1 | 3/2002 | Dreke et al. | |
| 2002/0061743 A1 | 5/2002 | Hutcheson et al. | |
| 2002/0119821 A1* | 8/2002 | Sen et al. | 463/42 |
| 2002/0150076 A1 | 10/2002 | Lai et al. | |
| 2003/0105812 A1 | 6/2003 | Flowers et al. | |
| 2003/0217158 A1 | 11/2003 | Datta | |
| 2004/0192366 A1 | 9/2004 | Lai et al. | |
| 2004/0204247 A1* | 10/2004 | Walker et al. | 463/42 |
| 2004/0224773 A1 | 11/2004 | Sham | 463/42 |
| 2005/0282637 A1* | 12/2005 | Gatto et al. | 463/42 |
| 2006/0281554 A1* | 12/2006 | Gatto et al. | 463/42 |
| 2006/0287099 A1* | 12/2006 | Shaw et al. | 463/42 |

FOREIGN PATENT DOCUMENTS

| | | |
|---|---|---|
| GB | 2 375 009 A | 10/2002 |
| GB | 2 399 992 A | 9/2004 |
| JP | 2002-200362 | 7/2002 |
| JP | 2003-010549 | 1/2003 |
| JP | 2004-021995 | 1/2004 |
| JP | 2004-180003 | 6/2004 |
| JP | 2004-265325 | 9/2004 |
| JP | 2004-362545 | 12/2004 |
| WO | WO 2006/069521 A1 | 7/2006 |

OTHER PUBLICATIONS

International Preliminary Report on Patentability for International Application No. PCT/CN2005/002226, dated Jul. 3, 2007.
Written Opinion for International Application No. PCT/CN2005/002226, dated Mar. 30, 2006.
Supplementary European Search Report for International Application No. PCT/CN2005/002226, dated Mar. 14, 2008.
First Office Action for Chinese Patent Application No. 200410104104.3, dated Nov. 16, 2007.
Second Office Action for Chinese Patent Application No. 200410104104.3, dated Oct. 24, 2008.
Second Office Action for European Patent Application No. 05823415.4, dated Jan. 27, 2009.
Fourth Office Action for European Patent Application No. 05823415.4, dated Mar. 26, 2010.
Office Action for Japanese Patent Application No. 2007-548673, dated Mar. 23, 2010.
Office Action for Korean Patent Application No. 2008-010957679, dated Feb. 28, 2008.
Notice of Reasons for Rejection for correspondine Japanese Application No. 2007-548673, dated Aug. 26, 2009.

* cited by examiner

SYSTEM OF MOBILE ONLINE GAME AND METHOD FOR COMMUNICATING BETWEEN MOBILE GAME TERMINALS

CROSS-REFERENCES TO RELATED APPLICATIONS

This is a continuation of International Application No. PCT/CN2005/002226, which was filed on Dec. 16, 2005, and which, in turn, claimed the benefit of Chinese Patent Application No. 200410104104.3, which was filed on Dec. 29, 2004, the entire disclosures of which are hereby incorporated herein by reference.

BACKGROUND OF THE DISCLOSURE

1. Field of the Invention

The present invention relates to the field of mobile online game services, and particularly, to a system of mobile online game and a method for communicating between mobile game terminals.

2. Background of the Invention

At present, a mobile online game system mainly includes a game platform and mobile game terminals. The game platform is used for providing users with a series of such services as game service release, parallel operation of multiple game services, discovery of the user of a game service, process control of game operation, charging of the user account. The mobile game terminal provides a game platform for users to access and an operating platform for users to play games.

In the existing mobile online game system, the data interaction between a game platform and numerous mobile game terminals is implemented through a communication network which is huge. The mobile game terminal mainly includes a game application unit, which forwards the data generated by the game operation to a Mobile Game Platform (MGP) of the game platform for corresponding processing. The game platform primarily includes the MPG, which receives the data sent from a mobile game terminal through a communication network, and performs the corresponding processing according to the type of the data received by the MGP The data sent from the mobile game terminal to the MPG primarily include two parts; one part is core data for game logic processing, system management, billing, and etc, and the core data is the main part of the game platform service, and needs corresponding analysis or processing by the MGP; the other part is communication data between the mobile game terminals such as interaction data of voice or text etc, and the communication data is sent from an originating mobile game terminal and forwarded through the MGP to a destination mobile game terminal.

The inventors found in the inventing processes that in the above processes, the MGP does not perform any processing to the communication data between the mobile game terminals, but only acts as a forwarder. Although the data forwarding is not the main service of the game platform, the system resource is limited after all, so along with the user group of game platform becoming huger and huger, even the service of just forwarding data through the game platform may consume considerable system resources, which lead to a heavy load of service processing for the game platform. Since the communication between the mobile terminals is performed by the data forwarding via the game platform, the interaction periods are prolonged, the communication rate is decreased, and the efficiency and effect of operation of the whole mobile online game system are affected.

SUMMARY OF THE INVENTION

Embodiments of the present invention provide a mobile online game system, including:

a first mobile game terminal acquiring a Peer-to-Peer (P2P) communication address of a second mobile game terminal from a game platform, creating a P2P connection with the second mobile game terminal, and communicating with the second mobile game terminal via the P2P connection.

Optionally, the first mobile game terminal further sends identifier (ID) information of the second mobile game terminal to the game platform; creates the P2P connection with the second mobile game terminal according to the P2P communication address of the second mobile game terminal; sends communication data to the second mobile game terminal via the P2P connection; and receives communication data from the second mobile game terminal via the P2P connection;

the game platform stores P2P registration information of mobile game terminals, and the P2P registration information of mobile game terminals includes the P2P communication addresses of the mobile game terminals; gets the P2P communication address of the second mobile game terminal according to the ID information of the second mobile game terminal; and returns the P2P communication address of the second mobile game terminal to the first mobile game terminal.

Optionally the P2P registration information further includes authentication information of the mobile game terminals;

the game platform determines that the first mobile game terminal has right to create the P2P connection with the second mobile game terminal according to the P2P registration information, returns the P2P communication address of the second mobile game terminal to the first mobile game terminal.

Embodiments of the present invention provide as well a method for communicating between the mobile game terminals which includes:

acquiring, by a first mobile game terminal, a P2P communication address of a second mobile game terminal from a game platform;

creating, by the first mobile game terminal, a P2P connection with the second mobile game terminal according to the acquired P2P communication address of the second mobile game terminal;

communicating, by the first mobile game terminal, with the second mobile game terminal via the P2P connection.

Optionally, the process of acquiring includes:

sending, by the first mobile game terminal, a P2P connection creating request to the game platform, the P2P connection creating request carries ID information of the first mobile game terminal and ID information of the second mobile game terminal;

acquiring, by the game platform, the P2P communication address of the second mobile game terminal upon receiving the P2P connection creating request according to the ID information of the second mobile game terminal, and returning to the first mobile game terminal a response containing the P2P communication address of the second mobile game terminal.

Optionally, the process of acquiring by the game platform the P2P communication address upon receiving the P2P connection creating request and returning to the first mobile game terminal the response containing the P2P communication address of the second mobile game terminal further includes:

determining, by the game platform, that the first mobile game terminal has right to create a P2P connection with the second mobile game terminal upon receiving the P2P connection creating request, returning to the first mobile game terminal an authentication success response containing the P2P communication address of the second mobile game terminal.

Optionally, the process of determining that the first mobile game terminal has right to create the P2P connection with the second mobile game terminal includes:

acquiring P2P registration information of the second mobile game terminal according to the ID information of the second mobile game terminal for P2P connection;

upon determining that the P2P registration information contains record information representing that the second mobile game terminal is willing to create a P2P connection with the first mobile game terminal; determining that the first mobile game terminal has right to create the P2P connection with the second mobile game terminal.

Optionally, the process of sending by the first mobile game terminal the P2P connection creating request to the game platform includes:

sending, by the first mobile game terminal, the P2P connection creating request to the game platform upon receiving a P2P connection creating instruction.

Optionally, the method further includes:

determining, by the first mobile game terminal, that data generated by a game operation needs to be transmitted to the second mobile game terminal via the P2P connection, and sending the data to the second mobile game terminal via the P2P connection.

Optionally, the process of determining that the data generated by the game operation needs to be transmitted to the second mobile game terminal via the P2P connection further includes:

upon determining that the data carries information representing that the data needs to be transmitted via the P2P connection, determining that the data needs to be transmitted via the P2P connection.

Embodiments of the present invention provide as well a mobile game terminal, including:

a game application unit, sending identifier (ID) information of a second mobile game terminal to a game platform; sending communication data and a P2P communication address of the second mobile game terminal to a P2P application unit;

the P2P application unit, creating a P2P connection with the second mobile game terminal according to the P2P communication address of the second mobile game terminal received from the game application unit, sending the communication data received from the game application unit to the second mobile game terminal via the P2P connection, receiving communication data from the second mobile game terminal via the P2P connection, and sending the communication data received from the second mobile game terminal to the game application unit.

Embodiments of the present invention provide as well a game platform, including:

an MGP, sending ID information of a second mobile game terminal; and sending a P2P communication address of the second mobile game terminal to a first mobile game terminal;

a database, storing P2P registration information of mobile game terminals, and the P2P registration information of mobile game terminals including the P2P communication addresses of the mobile game terminals;

a P2P management unit, getting from the database the P2P communication address of the second mobile game terminal according to the ID information of the second mobile game terminal received from the MGP; returning the P2P communication address of the second mobile game terminal to the MGP.

Optionally, the P2P management unit includes:

a database query unit, reading from the database the P2P communication address of the second mobile game terminal according to the ID information of the second mobile game terminal, returning the P2P communication address of the second mobile game terminal to the MGP.

Optionally, the P2P registration information of mobile game terminals includes authentication information of mobile game terminals;

the P2P management unit further includes:

an authentication interface unit, reading from the database P2P registration information of the second mobile game terminal according the ID information of the second mobile game terminal, determining that the first mobile game terminal has right to create the P2P connection with the second mobile game terminal, and getting the P2P communication address of the second mobile game terminal.

Optionally, the P2P management unit further includes:

a database query unit, receiving a query instruction sent by the authentication interface unit, reading from the database the P2P registration information of the second mobile game terminal, and sending the P2P registration information to the authentication interface unit.

To sum up, in embodiments of the present invention, a first mobile game terminal originating a communication acquires the P2P communication address of a second mobile game terminal from a game platform, creates a P2P connection with the second mobile game terminal, i.e. the destination mobile game terminal, and communicates with the second mobile game terminal via the P2P connection. It may be seen that embodiments of the present invention do not need the game platform to forward data, which makes it is possible that the rate and efficiency of data interaction between the mobile game terminals are improved, the periods of data interaction are shortened, and the data processing load on the game platform is released, so that the running efficiency of the whole mobile online game system is thus improved.

DETAILED DESCRIPTION OF THE PREFERRED EMBODIMENTS

This invention is hereinafter further described in details with reference to the accompanying drawings so as to further clarify the technical schemes.

According to an embodiment of the present invention, a first mobile game terminal acquires the P2P communication address of a second mobile game terminal from a game platform, and creates a P2P connection with the second mobile game terminal according to the P2P communication address; the first mobile game terminal communicates with the second mobile game terminal via the P2P connection.

In the following descriptions, the originating mobile game terminal is equivalent to the first mobile game terminal, and the destination mobile game terminal is equivalent to the second mobile game terminal.

Figure 1:
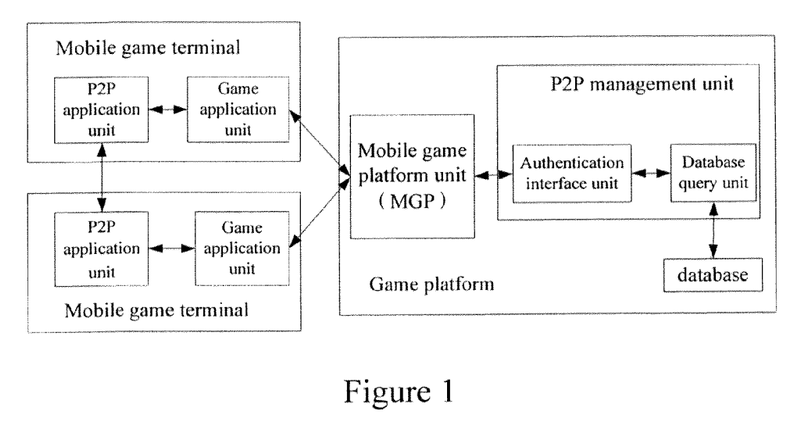
FIG. 1 is a block diagram illustrating a structure of the mobile online game system in accordance with an embodiment of the present invention.

As shown in FIG. 1, which illustrates the structure of a mobile online game system; the system mainly includes a game platform and multiple mobile game terminals.

Each mobile game terminal includes a game application unit and a P2P application unit. The game application unit is used for sending a P2P connection creating request to an MPG, upon receiving a response from the MPG, sending a P2P connection creating instruction to the P2P application unit; and after the P2P connection is created, determining whether the data generated by a game operation needs to be transmitted via the P2P connection, if the data needs to be transmitted, sending the data to the P2P application unit, otherwise, sending the data to the MPG; in addition, the game application unit is still used for receiving data from the other mobile game terminals sent by the P2P application unit of the other mobile game terminal. The P2P application unit, upon receiving the P2P connection creating instruction from the game application unit, creating a P2P connection with the destination mobile game terminal, and performing the data interaction with the other mobile game terminals via the P2P connection.

The P2P connection creating request sent by the game application unit to the MPG includes identifier (ID) information of the destination mobile game terminal, and the response from the MPG to the originating mobile game terminal includes the communication address of the destination mobile game terminal. And the communication network protocol corresponding to the created P2P connection may be the Transmission Control Protocol/Internet Protocol (TCP/IP) etc, the corresponding P2P communication address of the mobile game terminal is based on the TCP/IP as well.

The game platform includes an MPG, a database, and a P2P management unit. The MPG is used for receiving the P2P connection creating request sent by an originating mobile game terminal, and sending the P2P connection creating request to a P2P management unit, and receiving a response returned from the P2P management unit, then forwarding the response returned from the P2P management unit to the originating mobile game terminal. The database is used for storing P2P registration information of mobile game terminals. The P2P management unit is used for reading the P2P registration information of the destination mobile game terminal stored in the database according to identifier in the P2P connection creating request from the MPG, and sending the response from the P2P management unit to the MPG. The P2P registration information mainly includes the communication address of the destination mobile game terminal. The allocation of the communication address of the mobile game terminal i.e. the IP address, is controlled by the wireless network communication system, and the communication address of the mobile game terminal loading each time on the MPG platform may be different. Thus the information of the communication address of the mobile game terminal stored in the database is updated each time when the mobile game terminal loads on the game platform.

A first optional proposal is that the P2P management unit may include a database query unit, which is used for, upon receiving the P2P connection creating request forwarded by the MPG, reading the P2P registration information of the destination mobile game terminal stored in the database, and returning to the MPG a response carrying the communication address of the destination mobile game terminal. In this proposal, the P2P registration information mainly includes the communication address of the destination mobile game terminal.

A second optional proposal is that the P2P management unit may include an authentication interface unit, which is used for, upon receiving the P2P connection creating request forwarded by the MPG, reading the P2P registration information of the destination mobile game terminal stored in the database, implementing authentication of the mobile game terminal, and when the authentication succeeds, returning to the MPG an authentication success response carrying the communication address of the destination mobile game terminal. In this proposal, the P2P registration information includes the communication address of the destination mobile game terminal, and authentication information such as the record information provided upon registering representing whether the destination mobile game terminal is willing to create a P2P connection with the originating mobile game terminal etc.

A third optional proposal is that the P2P management unit may include both an authentication interface unit and a database query unit. The authentication interface unit, upon receiving the P2P connection creating request forwarded by the MPG, sends a query instruction to the database query unit, and receives the P2P registration information of the mobile game terminal returned by the database query unit, implements authentication of an originating mobile game terminal, and returns a response to the MPG. The database query unit, receives the query instruction from the authentication interface unit, reads the P2P registration information of the destination mobile game terminal stored in the database according to the query instruction, and sends the P2P registration information read from the database to the authentication interface unit. In this proposal, the P2P registration information includes the communication address of the destination mobile game terminal, and authentication information such as the record information provided upon registering representing whether the destination mobile game terminal is willing to create a P2P connection with the originating mobile game terminal etc.

Figure 2:
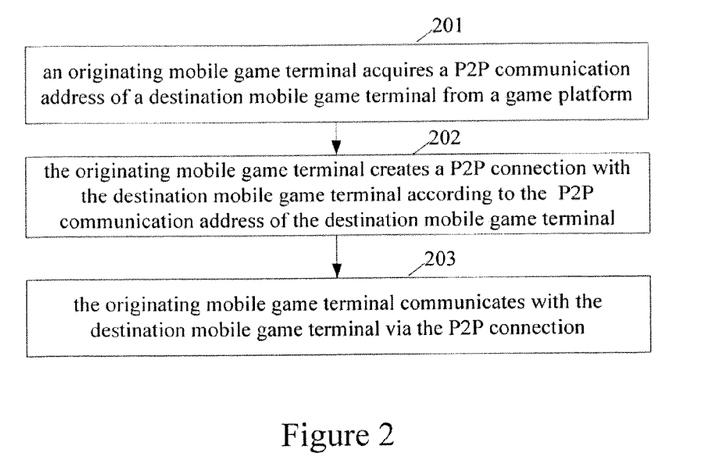
FIG. 2 is an overall flowchart illustrating the method for communicating between the mobile game terminals in accordance with embodiments of the present invention.

The structure of the mobile online game system is described hereinbefore according to an embodiment; and description of the method for communicating between the mobile game terminals will be given. The premise of the method in an embodiment of this invention is that: when the game service is running, a communication network port of the P2P application unit, such as TCP/IP port etc, is opened. The whole flow of the method is shown in FIG. 2, and the method specifically includes the following processes:

Process 201: an originating mobile game terminal acquires the P2P communication address of a destination mobile game terminal from a game platform.

Process 202: the originating mobile game terminal creates a P2P connection with the destination mobile game terminal according to the acquired P2P communication address.

Process 203: the originating mobile game terminal communicates with the destination mobile game terminal via the P2P connection.

Specific exemplary embodiments are described hereinafter with reference to accompanying drawings.

Figure 3:
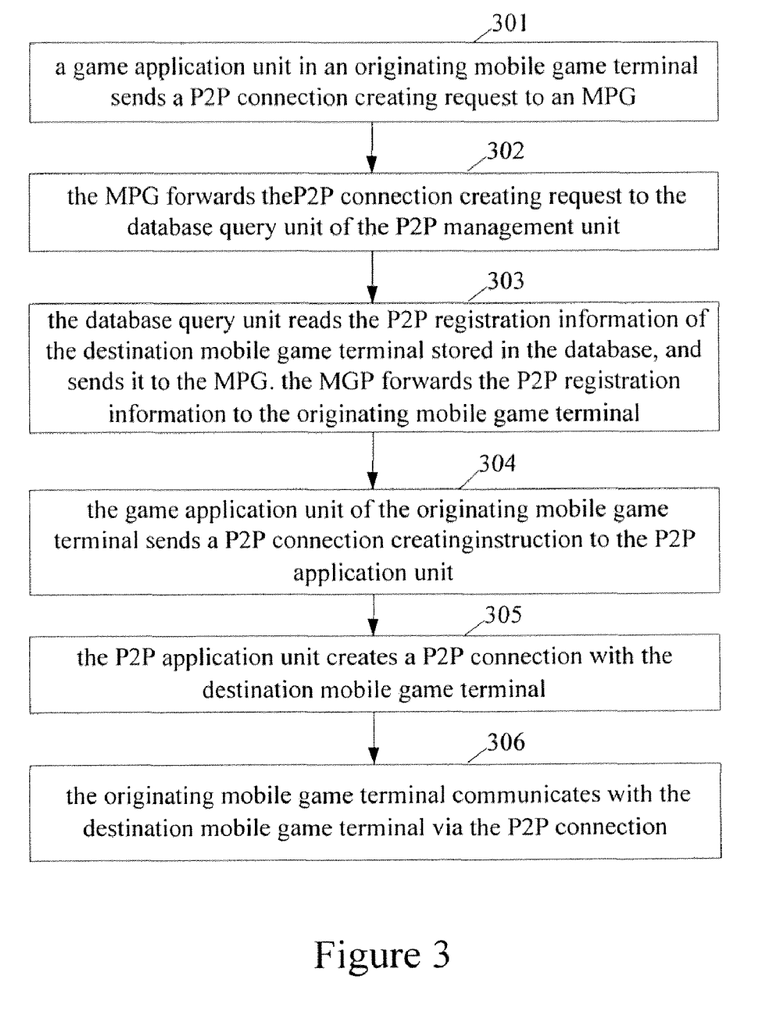
FIG. 3 is a flowchart of a method for communicating between mobile game terminals in accordance with the first embodiment of the present invention.

In the first embodiment of the invention, the game platform is the game service platform of the mobile online game system which includes an MPG, a database, and a P2P management unit The P2P management unit includes a database query unit; and the mobile game terminal includes a game application unit and a P2P application unit. As shown in FIG. 3, the process of this embodiment specifically includes the following processes:

Process 301: a game application unit in an originating mobile game terminal sends a P2P connection creating request to an MPG, and the P2P connection creating request contains the ID information of the originating mobile game terminal and the ID information of the destination mobile game terminal. The game application unit may, after receiving a P2P connection creating instruction from a user, send the P2P connection creating request to the MPG.

Process 302: the MPG, forwards the P2P connection creating request to the database query unit of the P2P management unit.

Process 303: the database query unit reads, according to the ID information of the destination mobile game terminal carried in the P2P connection creating request, the P2P registration information of the destination mobile game terminal stored in the database, and sends to the MPG the P2P registration information read from the database. The MGP, after receiving the P2P registration information, forwards the P2P registration information to the originating mobile game terminal. The P2P registration information mainly includes the P2P communication address of the destination mobile game terminal.

Process 304: the game application unit of the originating mobile game terminal, after receiving the P2P registration information sent from the MGP, sends a P2P connection creating instruction to the P2P application unit. The P2P connection creating instruction includes the P2P communication address of the destination mobile game terminal.

Process 305: the P2P application unit, after receiving the P2P connection creating instruction sent by the game application unit, creates a P2P connection with the destination mobile game terminal according to the P2P communication address of the destination mobile game terminal carried in the P2P connection creating instruction.

Process 306: the originating mobile game terminal communicates with the destination mobile game terminal via the P2P connection, and the process ends.

The game application unit, after the P2P connection is created, determines whether the data generated by a game operation in the running of game needs to be transmitted via a P2P connection, if the data needs to be transmitted, sends the data to the P2P application unit which forwards the data to the destination mobile game terminal via a P2P connection; otherwise, sends the data to the MPG of the mobile game platform for corresponding processing.

The determining of whether the data generated by a game operation in the running of game needs to be transmitted via a P2P connection is the determining of whether the data generated by the game operation in the running of game is communication data, if the data is communication data, the data needs to be transmitted via a P2P connection; or the data is common game data. Alternatively, information representing the need of the transmission via the P2P connection may be carried by the communication data to be sent to the destination mobile game terminal, so that whether the data needs to be transmitted via a P2P connection may be determined by determining whether the information representing the need of the transmission via the P2P connection is carried by the data.

Figure 4:
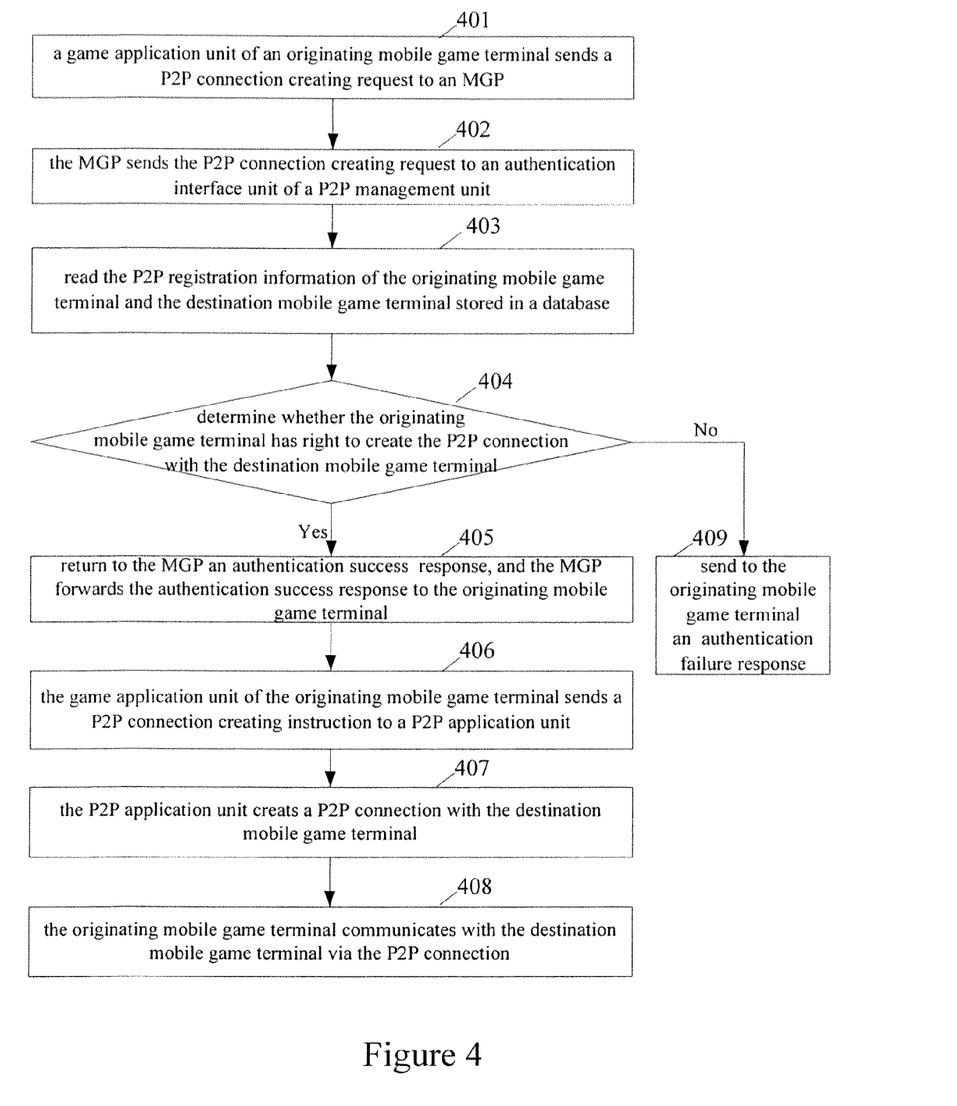
FIG. 4 is a flowchart of a method for communicating between mobile game terminals in accordance with the second embodiment of the present invention.

The foregoing description is the first embodiment of the invention, and a second embodiment of the invention will be described hereinafter. In the second embodiment of the invention, the game platform is a game service platform of the mobile online game system including: an MPG, a database, and a P2P management unit which includes an authentication interface unit; and the mobile game terminal includes a game application unit and a P2P application unit. Different to the first embodiment, in this embodiment, the authentication interface unit of the game platform receives a P2P connection creating request sent by the originating mobile game terminal, and queries in the database, acquires the P2P registration information according the request for creating a P2P connection from the MGP, and implements authentication of the originating mobile game terminal. As shown in FIG. 4, the process of this embodiment specifically includes the following processes:

Process 401: a game application unit of an originating mobile game terminal sends a P2P connection creating request to an MGP, and ID information of an originating mobile game terminal and ID information of a destination mobile game terminal is carried in the request. The game application unit may, after receiving a P2P connection creating instruction from a user, send the P2P connection creating request to the MGP.

Process 402: the MGP, after receiving the P2P connection creating request, sends the P2P connection creating request to an authentication interface unit of a P2P management unit.

Process 403: the authentication interface unit of the P2P management unit, after receiving the P2P connection creating request, reads, according to the ID information of the originating mobile game terminal and ID information of the destination mobile game terminal carried in the P2P connection creating request, the P2P registration information of the originating mobile game terminal and the destination mobile game terminal stored in a database. The P2P registration information mainly includes right information of the originating mobile game terminal and right information of the destination mobile game terminal, and the P2P communication address of the destination mobile game terminal, etc.

Process 404: the authentication interface unit determines whether the originating mobile game terminal has right to create a P2P connection with the destination mobile game terminal according to the P2P registration information read from the database, if the originating mobile game terminal has the right, the process continues to Process 405; otherwise, the process jumps to Process 409.

The determining of whether the originating mobile game terminal has right to create the P2P connection with the destination mobile game terminal may include: determining whether the P2P registration information of the destination mobile game terminal includes record information representing that the destination mobile game terminal is willing to create a P2P connection with the originating mobile game terminal, if the record information is included, determining that the originating mobile game terminal has right to create the P2P connection with the destination mobile game terminal; otherwise, determining that the originating mobile game terminal does not have the right.

Process 405: the authentication interface unit returns to the MGP an authentication success response for creating a P2P connection, and the MGP forwards the authentication success response to the originating mobile game terminal, and the P2P communication address of the destination mobile game terminal is carried in the authentication success response.

Process 406: the game application unit of the originating mobile game terminal, after receiving the authentication success response sent by the MGP, sends a P2P connection creating instruction to a P2P application unit. The P2P connection creating instruction contains the P2P communication address of the destination mobile game terminal.

Process 407: the P2P application unit, after receiving the P2P connection creating instruction, creates a P2P connection with the destination mobile game terminal according to the P2P communication address of the destination mobile game terminal.

Process 408: the originating mobile game terminal communicates with the destination mobile game terminal via the P2P connection, and the process ends.

Furthermore, after the P2P connection is created, the game application unit determines whether the data generated by a game operation in the running of game needs to be transmitted via the P2P connection, if the data needs to be transmitted, sends the data to the P2P application unit which forwards the data to the destination mobile game terminal via a P2P connection; otherwise, sends the data to the MPG of the mobile game platform. To determine whether the data generated by a game operation in the running of game needs to be transmitted to the destination mobile game terminal via the P2P connection is to determine whether the data generated by the game operation in the running of game is communication data, if the data is communication data, determines that the data needs to be transmitted via the P2P connection, otherwise, determines that the data is common game data. Alternatively, information representing the need of the transmission via the P2P connection may be carried by the communication data sent to the destination mobile game terminal, so that whether the data needs to be transmitted via a P2P connection may be determined by determining whether the data carries the information representing the need of the transmission via the P2P connection.

Process 409: the authentication interface unit returns to the MGP an authentication failure response for creating a P2P connection, and the MGP forwards the authentication failure response to the originating mobile game terminal, and the process ends.

Figure 5:
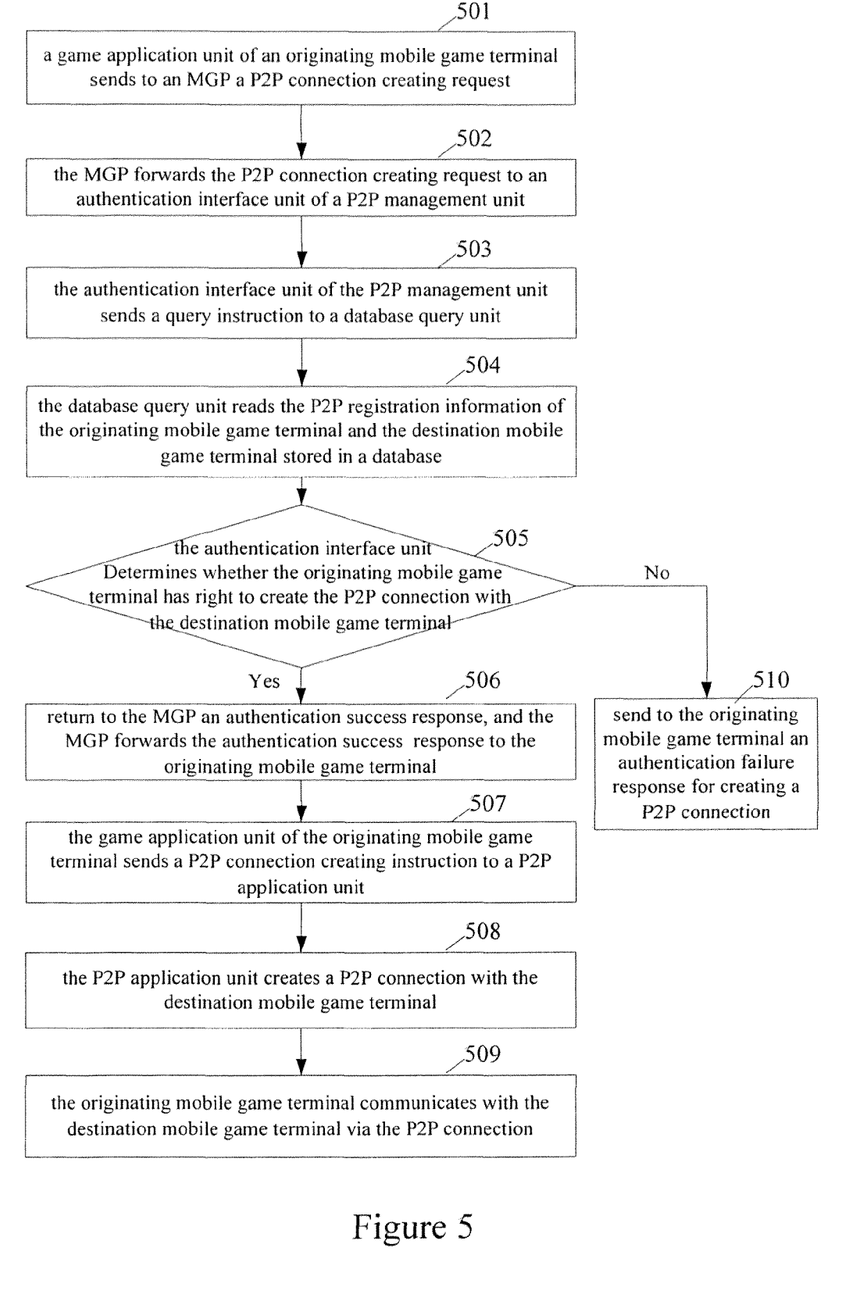
FIG. 5 is a flowchart of a method for communicating between mobile game terminals in accordance with the third embodiment of the present invention.

The foregoing description is the second embodiment of the invention, and a third embodiment of the invention will be given hereinafter. In the third embodiment of the method, the game platform is a game service platform of the mobile online game system including: an MPG, a database, and a P2P management unit which includes an authentication interface unit and a database query unit; and the mobile game terminal includes a game application unit and a P2P application unit. Different to the second embodiment, in this embodiment, after receiving a P2P connection creating request sent from the originating mobile game terminal, rather than querying the database directly, the authentication interface unit of the game platform sends a query instruction to a database query unit connected with the database; and the database query unit, after receiving the query instruction, reads the P2P registration information stored in the database, and sends the P2P registration information read from the database to the authentication interface unit; the authentication interface unit imple-ments authentication of the originating mobile game terminal. As shown in FIG. 5, the process of the embodiment specifically includes the following processes:

Process 501: a game application unit of an originating mobile game terminal sends a P2P connection creating request to an MGP, and ID information of an originating mobile game terminal and a destination mobile game terminal is carried in the P2P connection creating request. The game application unit may send the P2P connection creating request to the MGP after receiving a P2P connection creating instruction from a user.

Process 502: the MGP, after receiving the P2P connection creating request, forwards the P2P connection creating request to an authentication interface unit of a P2P management unit.

Process 503: the authentication interface unit of the P2P management unit, after receiving the P2P connection creating request, sends a query instruction to a database query unit of the P2P management unit, and the ID information of the originating mobile game terminal and the destination mobile game terminal is contained in the query instruction.

Process 504: the database query unit, after receiving the query instruction, reads the P2P registration information stored in a database, and sends the P2P registration information read from the database to the authentication interface unit, the P2P registration information mainly includes right information of the originating mobile game terminal and right information of the destination mobile game terminal, and P2P communication address of the destination mobile game terminal.

Process 505: the authentication interface unit, after receiving the P2P registration information sent by the database query unit, determines whether the originating mobile game terminal has right to create a P2P connection with the destination mobile game terminal, if the originating mobile game terminal has the right, the process continues to Process 506; otherwise, the process jumps to Process 510.

The determining of whether the originating mobile game terminal has right to create the P2P connection with the destination mobile game terminal may include: determining whether the P2P registration information includes record information representing that the destination mobile game terminal is willing to create a P2P connection with the originating mobile game terminal, if the record information is included, determining that the originating mobile game terminal has right to create the P2P connection with the destination mobile game terminal; otherwise, determining that the originating mobile game terminal does not have the right.

Process 506: the authentication interface unit returns to the MGP an authentication success response, which includes the P2P communication address of the destination mobile game terminal, and the MGP forwards the authentication success response to the originating mobile game terminal.

Process 507: the game application unit of the originating mobile game terminal, after receiving the authentication success response, sends a P2P connection creating instruction to a P2P application unit, which includes the P2P communication address of the destination mobile game terminal.

Process 508: the P2P application unit, after receiving the P2P connection creating instruction sent by the game application unit, creates a P2P connection with the destination mobile game terminal according to the P2P communication address of the destination mobile game terminal contained in the P2P connection creating instruction.

Process 509: the originating mobile game terminal communicates with the destination mobile game terminal via the P2P connection, and the process ends.

After the P2P connection is created, the game application unit determines whether the data generated by a game operation in the running of game needs to be transmitted via the P2P connection, if the data needs to be transmitted, sends the data to the P2P application unit which forwards the data to the destination mobile game terminal via the P2P connection; otherwise, sends the data to the MPG of the mobile game platform for corresponding processing. To determine whether the data generated by a game operation in the running of game needs to be transmitted to the destination mobile game terminal via the P2P connection is to determine whether the data generated by the game operation in the running of game is communication data, if the data is communication data, determines that the data needs to be transmitted via the P2P connection, otherwise, determines that the data is common game data. Alternatively, information representing the need of the transmission via the P2P connection may be carried by the communication data sent to the destination mobile game terminal, so that whether the data needs to be transmitted via a P2P connection may be determined by determining whether the data carries the information representing the need of the transmission via the P2P connection.

Process 510: the authentication interface unit returns to the MGP an authentication failure response for creating a P2P connection, and the MGP forwards the authentication failure response to the originating mobile game terminal, and the process ends.

It should be appreciated that the foregoing is only preferred embodiments of the invention and is not for use in limiting the invention. Any modification, equivalent substitution, and improvement without departing from the spirit and principle of this invention should be covered in the protection scope of the invention.

What is claimed is:

1. A mobile online game system comprising a first mobile game terminal, a second mobile game terminal and a game platform, wherein
the first mobile game terminal is configured to (i) send identifier (ID) information of the second mobile game terminal to the game platform, acquire a Peer-to-Peer (P2P) communication address of the second mobile game terminal from the game platform, (ii) create a P2P connection with the second mobile game terminal according to the P2P communication address of the second mobile game terminal, after the P2P connection is created, determine whether data generated by the game operation needs to be transmitted via the P2P connection, if the data generated by the game operation needs to be transmitted via the P2P connection, (iii) send the data to the second mobile game terminal via the P2P connection, otherwise, send the data to the game platform, and (iv) receive communication data from the second mobile game terminal via the P2P connection; and
the game platform is configured to (i) store P2P registration information of mobile game terminals, and wherein the P2P registration information of mobile game terminals comprises the P2P communication addresses of the mobile game terminals, (ii) get the P2P communication address of the second mobile game terminal according to the ID information of the second mobile game terminal received from the first mobile game terminal, and (iii) return the P2P communication address of the second mobile game terminal to the first mobile game terminal.

2. The mobile online game system of claim 1, wherein the P2P registration information further comprises authentication information of the mobile game terminals;
the game platform is further configured to determine that the first mobile game terminal has a right to create the P2P connection with the second mobile game terminal according to the P2P registration information, and return the P2P communication address of the second mobile game terminal to the first mobile game terminal.

3. The mobile online game system of claim 1, wherein
the first mobile game terminal is further configured to, if determined that the data generated by the game operation is communication data or the data generated by the game operation carries information representing that the data generated by the game operation needs to be transmitted via the P2P connection, determine the data generated by the game operation needs to be transmitted via the P2P connection, send the data generated by the game operation to the second mobile game terminal via the P2P connection, and receive data from the second mobile game terminal via the P2P connection.

4. A method for communicating between mobile game terminals, comprising:
sending, by a first mobile game terminal, a P2P connection creating request to a game platform, where the P2P connection creating request comprises ID information of the first mobile game terminal and ID information of a second mobile game terminal, such that the game platform acquires the P2P communication address of the second mobile game terminal upon receiving the P2P connection creating request according to the ID information of the second mobile game terminal;
receiving, by the first mobile game terminal, a response containing the P2P communication address of the second mobile game terminal returned by the game platform;
creating, by the first mobile game terminal, a P2P connection with the second mobile game terminal according to the P2P communication address of the second mobile game terminal; and
after the P2P connection is created, determining, by the first mobile game terminal, whether data generated by a game operation needs to be transmitted via the P2P connection;
if the data generated by the game operation needs to be transmitted via the P2P connection, sending the data to the second mobile game terminal via the P2P connection; and
otherwise, sending the data to the game platform; and receives communication data from the second mobile game terminal via the P2P connection.

5. The method of claim 4, wherein the process of acquiring by the game platform the P2P communication address upon receiving the P2P connection creating request and returning to the first mobile game terminal the response containing the P2P communication address of the second mobile game terminal further comprises:
determining, by the game platform, that the first mobile game terminal has right to create the P2P connection with the second mobile game terminal upon receiving the P2P connection creating request, and returning an authentication success response containing the P2P communication address of the second mobile game terminal to the first mobile game terminal.

6. The method of claim 5, wherein the process of determining that the first mobile game terminal has right to create the P2P connection with the second mobile game terminal comprises:

acquiring P2P registration information of the second mobile game terminal according to the ID information of the second mobile game terminal for P2P connection; and upon determining that the P2P registration information contains record information representing that the second mobile game terminal is willing to create the P2P connection with the first mobile game terminal, determining that the first mobile game terminal has right to create the P2P connection with the second mobile game terminal.

7. The method of claim 4, wherein the process of sending by the first mobile game terminal the P2P connection creating request to the game platform comprises:

sending, by the first mobile game terminal, the P2P connection creating request to the game platform upon receiving a P2P connection creating instruction.

8. The method of claim 4, further comprising:

determining, by the first mobile game terminal, that data generated by a game operation needs to be transmitted to the second mobile game terminal via the P2P connection, and sending the data to the second mobile game terminal via the P2P connection.

9. The method of claim 8, wherein the process of determining that the data generated by the game operation needs to be transmitted to the second mobile game terminal via the P2P connection further comprises:

upon determining that the data carries information representing that the data needs to be transmitted via the P2P connection, determining that the data needs to be transmitted via the P2P connection.

10. The method of claim 4, wherein the process of determining that the data generated by the game operation needs to be transmitted via the P2P connection further comprises:

upon determining that the data generated by the game operation carries information representing that the data needs to be transmitted via the P2P connection or the data generated by the game operation is communication data, determining that the data generated by the game operation needs to be transmitted via the P2P connection.

11. A mobile game terminal, comprising a game application unit and a P2P application unit, wherein the game application unit is configured to send identifier (ID) information of a second mobile game terminal to a game platform and send a P2P communication address of the second mobile game terminal to a P2P application unit; and the P2P application unit is configured to create a P2P connection with the second mobile game terminal according to the P2P communication address of the second mobile game terminal received from the game application unit, after the P2P connection is created, the game application unit is further configured to determine whether data generated by a game operation needs to be transmitted via the P2P connection, if determined that the data generated by the game operation needs to be transmitted via the P2P connection, send the data to the P2P application unit which is configured to perform data interaction between mobile game terminals via the P2P connection, and otherwise, send the data generated by the game operation to the game platform; and the P2P application unit is further configured to send the data received from the game application unit to the second mobile game terminal via the P2P connection, receive data from the second mobile game terminal via the P2P connection, and send the data received from the second mobile game terminal to the game application unit.

12. A game platform, comprising:

a Mobile Game Platform unit (MGP), configured to send ID information of a second mobile game terminal and send a P2P communication address of the second mobile game terminal to a first mobile game terminal;

a database, configured to store P2P registration information of mobile game terminals, wherein the P2P registration information of mobile game terminals comprises the P2P communication addresses of the mobile game terminals; and a P2P management unit, configured to get from the database the P2P communication address of the second mobile game terminal according to the ID information of the second mobile game terminal received from the MGP, and return the P2P communication address of the second mobile game terminal to the MGP.

13. The game platform of claim 12, wherein the P2P management unit comprises:

a database query unit, configured to read the P2P communication address of the second mobile game terminal from the database according to the ID information of the second mobile game terminal, and return the P2P communication address of the second mobile game terminal to the MGP.

14. The game platform of claim 12, wherein the P2P registration information of mobile game terminals comprises authentication information of the mobile game terminals;

the P2P management unit further comprises:

an authentication interface unit, configured to read from the database P2P registration information of the second mobile game terminal according to the ID information of the second mobile game terminal, determine that the first mobile game terminal has right to create a P2P connection with the second mobile game terminal, and get the P2P communication address of the second mobile game terminal.

15. The game platform of claim 14, wherein the P2P management unit further comprises:

a database query unit, configured to receive a query instruction sent by the authentication interface unit, read from the database the P2P registration information of the second mobile game terminal, and send the P2P registration information to the authentication interface unit.

16. A computer readable storage medium, comprising computer program code means to execute the steps of the method for communication between mobile game terminals according to claim 4.

17. A computer readable storage medium, comprising computer program code means to execute the steps of the method for communication between mobile game terminals according to claim 5.

18. A computer readable storage medium, comprising computer program code means which when executed by a computer unit enables the computer unit to:

send identifier (ID) information of a second mobile game terminal to a game platform;

create a P2P connection with the second mobile game terminal according to the P2P communication address of the second mobile game terminal;

after the P2P connection is created, determine whether data generated by a game operation needs to be transmitted via the P2P connection; and if determined that the data generated by the game operation needs to be transmitted via the P2P connection, send the data generated by the game operation to the second mobile game terminal via the P2P connection, and otherwise, send the data generated by the game operation to the game platform.

19. The computer readable storage medium of claim 18, comprising computer program code means which when executed by computer unit enables the computer unit to:

receive identifier (ID) information of a second mobile game terminal from a first mobile game terminal, send the ID information of the second mobile game terminal, and send a P2P communication address of the second mobile game terminal to the first mobile game terminal;

store P2P registration information of mobile game terminals in a database, wherein the P2P registration information of mobile game terminals comprises the P2P communication addresses of the mobile game terminals; and get from the database the P2P communication address of the second mobile game terminal according to the ID information of the second mobile game terminal received from the MGP, and return the P2P communication address of the second mobile game terminal to the MGP.

* * * * *